United States Patent [19]
Anderson

[11] Patent Number: 5,782,521
[45] Date of Patent: Jul. 21, 1998

[54] AIR FLOW MANAGEMENT SYSTEM FOR TRACTOR TRAILERS

[76] Inventor: James Anderson, 5610 W. 175th St., Tinley Park, Ill. 60477

[21] Appl. No.: 649,524

[22] Filed: May 17, 1996

[51] Int. Cl.⁶ .................................................. B60P 7/04
[52] U.S. Cl. ........................................ 296/181; 296/180.4
[58] Field of Search ............................... 296/180.1, 181, 296/155, 166, 40, 183; 49/50; 52/127.2, 204.1

[56] References Cited

U.S. PATENT DOCUMENTS

| | | | |
|---|---|---|---|
| 926,971 | 7/1909 | Ahrens | 296/180.4 |
| 2,514,695 | 7/1950 | Dempsey | 296/180.4 |
| 2,583,643 | 1/1952 | Grilley | 296/181 |
| 3,572,815 | 3/1971 | Hackney | 296/40 |
| 4,379,585 | 4/1983 | Strick | 296/155 X |

*Primary Examiner*—Ed L. Swinehart

[57] ABSTRACT

An air flow management system for reducing wind resistance in an empty tractor trailer and a method for reducing aerodynamic drag in a tractor trailer.

2 Claims, 1 Drawing Sheet

5,782,521

AIR FLOW MANAGEMENT SYSTEM FOR TRACTOR TRAILERS

The present invention relates to an air flow system for reducing wind resistance, and a method for reducing aerodynamic drag in empty tractor trailers.

BACKGROUND OF THE INVENTION

Vehicles such as vans and tractor trailer rigs present large flat surfaces on their upper forward portions that cause significant air resistance. In recent years, it has become increasingly common to mount an air-flow deflector or drag reducing device on the cab or directly on the trailer portion of the vehicle. These drag reducing devices direct the air passing over the top of the truck in such a way that the resistance of wind hitting the flat portion of the trailer being pulled by the cab is minimized.

Many different types of air-flow deflectors have been proposed for use with tractor trailer rigs in order to reduce the effects of wind resistance. Typical of such deflectors are the ones shown by Engel (U.S. Pat. No. 5,340,190) and Wiley, Jr. et al (U.S. Pat. No. 5,174,626). All of these devices require installation of equipment which has virtually no other use than to divert air flow.

Commonly, tractor trailer trucks carry loads that must not be exposed to the elements. However, these closed trailers, even when empty, cause a large amount of aerodynamic drag on the tractor because of the large frontal area of the trailer. Therefore, when the trailer is empty, an unnecessary expenditure of energy, i.e. fuel, is required to move the trailer to pick up its next load. On the average, trailer will run empty about 20 to 40 percent of the time.

It is an object of the present invention to provide an air flow management system that reduces aerodynamic drag on empty trailers, thereby reducing hauling costs.

It is another object of the present invention to provide an air flow management system that is functional in ways other than management of air flow.

Other objects, advantages, features and characteristics of the present invention will become more apparent upon consideration of the following description and the appended claims.

SUMMARY OF THE INVENTION

This invention provides an air flow management system effective for reducing wind resistance in an empty tractor trailer and a method for reducing aerodynamic drag. The system and method are effective for reducing wind resistance at least about 22 percent as compared to a closed trailer. This reduction in wind resistance provides significant savings in terms of fuel costs as trailer may be run without a load (empty) up to 40 percent of the time.

DETAILED DESCRIPTION OF THE INVENTION

Figure 1:
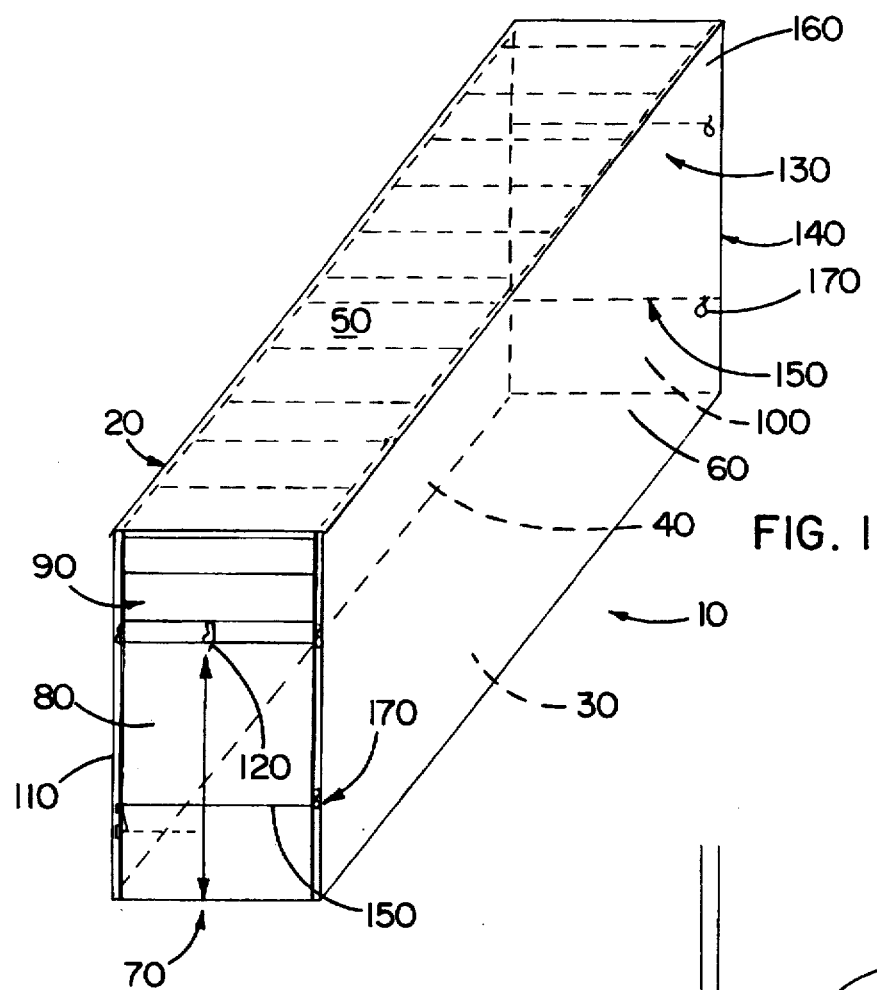
FIG. 1 is a front perspective view of a trailer equipped with an air flow management system.

Turning now to the drawings in greater detail and considering first FIG. 1, there is shown a trailer unit (10). The trailer unit comprises in combination a frame (20), a floor (30), side walls (40), a roof (50), a means for defining an entrance opening (80) and a means for defining an exit opening (100), all defining an interior (60).

Entrance Opening

In one aspect of th e invention, the front end of the trailer (70) has a means for defining an entrance opening (80) effective for allowing air flow to enter the front end of the trailer. In an important aspect of the invention, the means for defining the entrance to the front end of the trailer is a front retractable door (90). The front retractable door is segmented such that it can be raised and stored under the roof of the trailer (50). The front retractable door slides along front tracks (110) which defines both sides of the entrance to the front end of the trailer. The front tracks (110) extend up and then horizontally under the roof of the trailer such that the front retractable door can be completely opened and stored under the roof of the trailer (50). The front retractable door further comprises a front latching means (120) for securing the door in the closed position, such as when the trailer contains a load. The front re tractable door in cooperation with the front track may also include a means for securing the front retractable door in the open position.

As shown in FIG. 1, the means for defining an entrance opening may be a front retractable door (90). However, the means defining an entrance opening may also be in the form of horizontal or vertical vents which can be opened such that they are effective for allowing air flow to enter the front end of the trailer. When the vents are in the closed position, they are effective to prevent moisture from entering the inside of the trailer.

Exit Opening

In another aspect of the invention, the rear of the trailer has a means for defining an exit opening (100) effective for allowing air flow to exit the trailer. In an important aspect of the invention, the means for defining the exit from the rear end of the trailer is a rear retractable door (130). The rear retractable door is segmented such that it can be raised and stored under the roof of the trailer (50). The rear retractable door slides along rear tracks (140) which defines both sides of the exit from the rear end of the trailer. The rear tracks (140) extends up and then horizontally under the roof of the trailer such that the rear retractable door can be completely opened and stored under the roof of the trailer (50). The rear retractable door further comprises a latching means for securing the door in the closed position, such as when the trailer contains a load. The rear retractable door in cooperation with the rear tracks may also include a means for securing the rear retractable door in the open position.

The rear exit opening further comprises a plate (160) that extends across the top of the exit opening. The plate extends down below the plane of the rear retractable door when the rear door is completely opened and is under or parallel to the roof of the trailer. The plate is effective for reducing the possibility that the rear door will blow shut while moving the open trailer. The plate may be made of the same material as the trailer or alternatively may be made of a light weight material, such as plastic.

Support Bars

In another aspect of the invention, the air flow management system may further comprise a support bar. Support bars provide the trailer with additional structural stability when the entrance and exit openings are present. As shown in FIG. 1, a support bar (150) extends horizontally across the entrance opening (80). When one support bar is used, it is located to bisect the entrance opening in about equal halves. When two support bars are used, they are located to bisect the entrance opening into about thirds. Similarly, a support bar may be placed in the exit opening. As in the entrance opening, a single support bar will be located to bisect the exit opening in about equal halves, and where two support bars are used, they are located to bisect the exit opening into about thirds.

In another aspect of the invention, the support bars may include a solid bar that is the same length as the entrance and exit opening. Alternatively, the support bar may be a telescoping bar that can be pull open to fit an existing opening and then locked to that length with recessed pins or couplings which tighten and fix the length of the bar.

Support bars used in both the entrance opening and the exit opening are removable. Where support bars are used, the entrance and exit openings of the trailer include a securing means (170) effective for securing a support bar horizontally across the entrance or exit opening of the trailer such that the support bar does not become dislodged when the open trailer is being moved.

The securing means (170) is located outside of the entrance (80) or exit openings (100) and in front of the front (110) or rear tracks (140). The securing means may be located at specific location or be in series down the entire length of outside of the exit and entrance openings.

Figure 2:
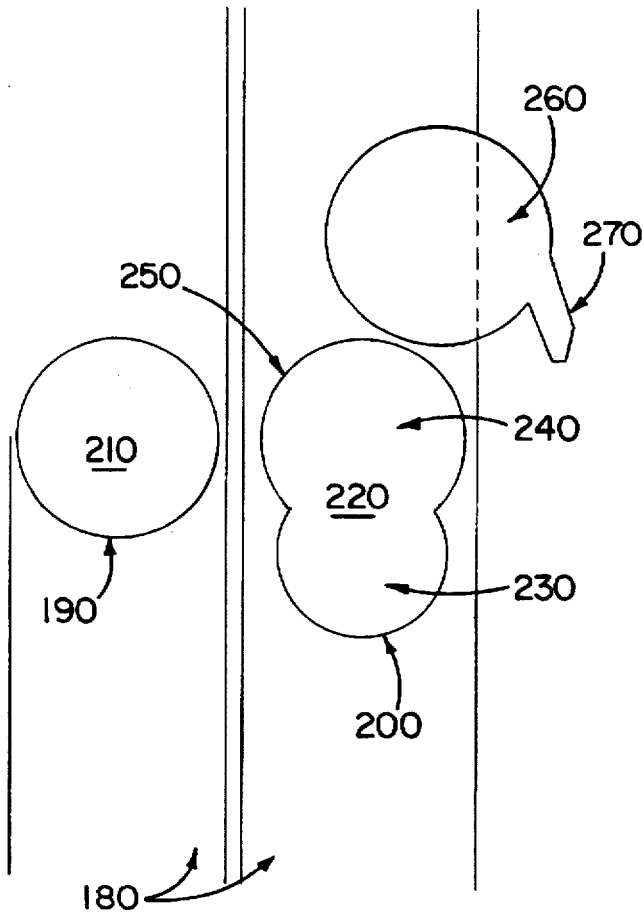
FIG. 2 is a front view of a securing means.

One alternative aspect of the securing means is set forth in FIG. 2. In this aspect, the securing means comprises a pair of matched indented receptacles (180) having a receiving end receptacle (190) and a locking end receptacle (200). The matched indented receptacles are located on either side of the entrance and exit opening and are the same distance up from the base of the entrance and exit opening.

The receiving end receptacle (190) includes a indented recessed opening (210) having a diameter effective for allowing a support to be inserted into it and effective for maintaining the support bar in the indented recessed opening while the trailer is being moved. In a more specific aspect, the matching locking end receptacle (200) has a recessed inverted figure eight opening (220). The end of the support bar that fits into the locking end receptacle (200) has a the same figure eight arrangement effective for allowing the support bar to be inserted into the locking end receptacle (200) and rotated such that the smaller portion of the figure eight on the support bar fits into the smaller part of the figure eight (230) in the locking end receptacle (200).

In using the securing means set forth in FIG. 2, a support bar having the same shape as the receiving end receptacle (190) is first inserted into the receiving end receptacle (190). The other end of the support bar, which has the same shape as the locking end receptacle (200), is then inserted into the locking end receptacle (200). The locking end receptacle (200) is configured to allow the support bar to be moved into the locking end receptacle (200). For example, where the locking end receptacle has the shape of an inverted figure eight, as in FIG. 2, the larger part of the figure eight (240) has an opening (250) effective for allowing the bar to be moved into the locking end receptacle (200). Once the support bar is inserted into the locking end receptacle, the support bar is rotated such that the part of the support bar with a similar shape to the smaller part of the figure eight fits into place into the smaller part of the figure eight (230) of the locking end receptacle.

The securing means in FIG. 2 further comprises a locking mechanism (260) effective for maintaining the horizontal bar in the securing means such that the horizontal bar does not fall out of the securing means when the trailer is being moved. As shown in FIG. 2, the locking mechanism may include a rotatable handle (270) secured above the locking end receptacle (200) that allows the user to rotate the locking mechanism (260) such that the locking mechanism blocks the larger part of the inverted figure eight (240) and prevents the support bar from bouncing out of the securing means.

Support bars can be removed and stored in the roof of the trailer so as to leave the trailer space completely full size. The trailer may include brackets in the roof of the trailer for storage of the support bars. Support bars can alternatively be stored at the base of the front end of the trailer. The base of the front end of the trailer can be equipped with any number of securing means as described above.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for reducing aerodynamic drag in a tractor trailer, the method comprising:

opening a front segmented retractable door on a trailer to define an entrance opening at a forward position of the trailer, the entrance opening effective for allowing air to enter the trailer; and opening a rear segmented retractable door on the trailer to define an exit opening at a rear position of the trailer, the exit opening effective for allowing air to exit the trailer.

positioning at least one removable horizontal support bar in the entrance opening and in the exit opening, wherein the removable horizontal support bar is held in place by a securing means, the removable horizontal support bar effective for providing structural stability to the trailer when entrance and exit openings are present;

the method effective for reducing wind resistance at least about 22 percent as compared to a closed trailer.

2. The method of claim 1, wherein the securing means comprises a pair of matched indented receptacles and a locking mechanism, the securing means including a receiving end receptacle and a locking end receptacle effective for maintaining the support bar in the securing means while the trailer is moving.

* * * * *